US012788089B2

(12) United States Patent
Dunn

(10) Patent No.: US 12,788,089 B2
(45) Date of Patent: Nov. 10, 2026

(54) ADHESIVE GARMENT WEIGHT

(71) Applicant: Christina Marie Dunn, River Vale, NJ (US)

(72) Inventor: Christina Marie Dunn, River Vale, NJ (US)

( * ) Notice: Subject to any disclaimer, the term of this patent is extended or adjusted under 35 U.S.C. 154(b) by 325 days.

(21) Appl. No.: 17/842,131

(22) Filed: Jun. 16, 2022

(65) Prior Publication Data

US 2022/0312876 A1 Oct. 6, 2022

Related U.S. Application Data

(62) Division of application No. 16/199,079, filed on Nov. 23, 2018, now abandoned.

(51) Int. Cl.

*A41F 17/02* (2006.01)
*B23P 15/00* (2006.01)
*C09J 5/00* (2006.01)
*A41F 17/04* (2006.01)
*B32B 37/26* (2006.01)

(52) U.S. Cl.

CPC .............. *A41F 17/02* (2013.01); *B23P 15/00* (2013.01); *C09J 5/00* (2013.01); *A41F 17/04* (2013.01); *B32B 2037/268* (2013.01)

(58) Field of Classification Search

None

See application file for complete search history.

(56) References Cited

U.S. PATENT DOCUMENTS 970,175 A * 9/1910 Brooks .................... A41F 17/00 2/273
1,017,268 A * 2/1912 Parsons .................... B24B 31/14 451/328
1,084,233 A * 1/1914 Roarke .................... A41F 17/00 2/273
8,153,221 B1 * 4/2012 MacKinnon .............. A41F 1/00 450/86
10,322,309 B2 * 6/2019 Feldman .................... A61F 5/02
2017/0157447 A1 * 6/2017 Brown ............. A63B 21/00065

FOREIGN PATENT DOCUMENTS

JP 2004099805 A * 4/2004
KR 20080039365 A * 5/2008 ........... A44B 18/003

OTHER PUBLICATIONS

Hendrix, Danielle. Windermere Prep graduate creates Dress Downs garment weights. Observer, Dec. 1, 2017. Retrieved online May 14, 2024.*

Machine Translation of KR-20080039365-A.*

* cited by examiner

*Primary Examiner* — David P Turocy

(74) *Attorney, Agent, or Firm* — NYLS Patent Law Clinic

(57) ABSTRACT

A garment weight having a weight portion comprising a plurality of exterior surfaces, a coating layer applied to each of the plurality of exterior surfaces of the weight portion and an adhesive layer applied to the coating layer of at least one of the exterior surfaces, wherein the adhesive layer is configured to releasably adhere to a garment such that the garment weight weighs down the garment.

3 Claims, 7 Drawing Sheets

Method 100

Method 100

ADHESIVE GARMENT WEIGHT

CROSS REFERENCE TO RELATED APPLICATIONS

This application is a divisional application of pending U.S. Patent Application Ser. No. 16/199,079. The parent application is hereby incorporated by reference in its entirety.

PRIORITY INFORMATION/INCORPORATION BY REFERENCE

This application claims priority to U.S. Provisional Application 62/590,485, filed Nov. 24, 2017 and entitled "Adhesive Garment Weight," the entirety of which is incorporated herein.

FIELD

The exemplary embodiments relate to the field of fashion. More particularly, the exemplary embodiments are in the technical field of men's and women's fashion accessories.

BACKGROUND INFORMATION

Generally, on gusty and windy days, garments often blow up causing a fashion faux pas and wearer shame. This is very common in environments with warmer temperatures and cities with high pedestrian foot traffic. In addition to the weather, there may also be manmade causes for the same problem, e.g., subway grates, air vents, etc. Thus, there is a need to prevent garments from blowing up to prevent a spectacle and wearer shame.

SUMMARY

An exemplary embodiment describes a garment weight having a weight portion comprising a plurality of exterior surfaces, a coating layer applied to each of the plurality of exterior surfaces of the weight portion and an adhesive layer applied to the coating layer of at least one of the exterior surfaces, wherein the adhesive layer is configured to releasably adhere to a garment such that the garment weight weighs down the garment.

The exemplary weight portion may be constructed of, for example, steel, lead, metal alloys, clay, or ceramics. The coating layer may be, for example, paint, silicone, or plastic. The adhesive layer may be, for example, a reusable adhesive, a pressure sensitive adhesive, etc. An overall weight of the exemplary garment weight may be 10 to 60 grams.

In one exemplary embodiment, the weight portion has a generally rectangular shape, comprising two parallel sides opposed to each other, two semi-circular sides opposed to each other, and two opposing surfaces. A ratio of a length of the parallel sides to a width of the semi-circular sides is in a range of 2-3 to 1. In another exemplary embodiment, each of the two parallel sides has a length in the range of 0.5 to 3.5 inches. In a further exemplary embodiment, the first one of the surfaces is flat and the second one of the surfaces is flat or dome shaped. In one exemplary embodiment, the thickness of the garment weight is in a range of 0.04 to 0.3 inches.

The exemplary garment weight may also include a protective covering applied to the adhesive layer, wherein the protective covering is paper and wherein the protective covering is removable by peeling the paper away from the adhesive layer.

The exemplary garment weight may be configured to be stored in a storage case comprising a tray with indentations to receive the garment weight.

In a still further exemplary embodiment a method of manufacturing a garment weight is described. The method includes stamping the garment weight, applying a surface coating to the garment weight, and applying an adhesive layer to a flat one of the surfaces of the garment weight. The method may further include cleaning and smoothing the stamped garment weight and applying a protective covering to the adhesive layer of the garment weight.

DETAILED DESCRIPTION

Figure 1:
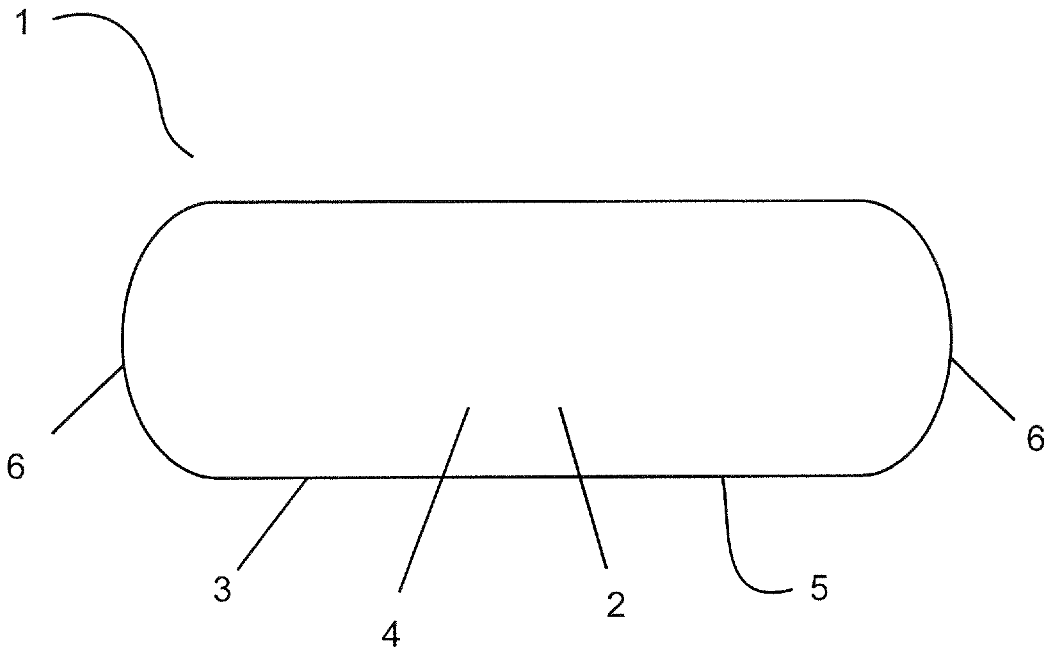
FIG. 1 shows a top view of an exemplary embodiment of a garment weight according to various embodiments described herein.

The exemplary embodiments may be further understood with reference to the following description and the appended drawings, wherein like elements are referred to with the same reference numerals. The exemplary embodiments describe a device that prevents a garment from being blown up or otherwise disturbed by weighing down the garment. The exemplary garment weight 1 may prevent a garment from being blown in disarray by providing a small weight that can be attached to a garment via an adhesive layer to discretely prevent the garment from being affected by natural or artificial wind. The exemplary garment weight is of such a size and weight that it is discretely attached to the garment without others realizing the garment weight is present or causing discomfort to the wearer but is of such a heft that the garment weight performs the functions described herein. The garment weight may then be removed by peeling it off the garment, leaving the fabric undamaged while allowing the garment weight to be reused. Accordingly, the exemplary garment weight described herein may prevent a wearer from embarrassment when garments are blown around due to wind gusts.

It is noted that the exemplary embodiments are described with reference to the garment being a skirt. However, it should be understood that the exemplary garment weight may be used in conjunction with any garment that may experience such a problem, e.g., dresses, ties, shorts, loose fitting pants, etc. It should also be noted that throughout this description exemplary dimensions and weights are provided for the garment weight. These weights and dimensions are only exemplary and those skilled in the art will understand that the dimensions and weights may be altered to accomplish the functionalities of the garment weight as described herein.

FIG. 1 shows a top view of an exemplary embodiment of a garment weight 1. The garment weight 1 includes a first surface 4, a second surface 5 (not seen in FIG. 1) and a side surface 3 which extends around the entire perimeter of the garment weight 1. As will be described in greater detail below, an adhesive layer 2 will be applied to the first surface 4 for attaching the garment weight 1 to the garment. The garment weight 1 may be constructed of any suitably dense material. Exemplary materials include steel, lead, metal alloys, clay, ceramics, etc. The garment weight 1 may be formed as a single, solid block or lozenge of the material. In other embodiments, the garment weight 1 may be formed from two or more layers of material. The layers of material may be a single material or different types of material that are layered. In the embodiment shown in FIG. 1, the garment weight 1 has two semi-circular sides 6 to avoid any sharp edges that may damage the fabric of the garment or the skin of the wearer. The garment weight 1 may be generally rectangular and relatively thin. This thin or low profile may reduce the potential for the garment weight 1 to catch or be loosened from the wearer's garment when in use. However, it should be understood that the garment weight 1 may take on other shapes and these shapes may depend on various factors, e.g., the size and/or weight of the garment weight 1, the type of garment with which the garment weight 1 is to be used, etc. For example, the garment weight 1 may also be circular or may take on a novelty shape, e.g., based on a particular designer of the garment, based on the type of garment, etc. It should also be understood that the use of the terms first, second and side surfaces are used for illustrative purposes and do not connote any specific orientation that is required of the garment weight 1. As described above, an adhesive layer 2 may be applied to the first surface 4 and thus, when in use (i.e., attached to the garment), the first surface 4 may be considered a garment facing surface.

In certain embodiments, the garment weight 1 may weigh approximately 0.35 to 0.70 ounces (10-20 grams). This weight will minimally, if at all, alter the shape, look or feel of the garment when the garment weight 1 is applied to the garment, e.g., the garment weight 1 will minimally affect the drape of the fabric. Additionally, the garment weight 1 will have sufficient mass to hold the edge of the garment in place. In exemplary embodiments, different garment weights weigh in the range of 10-60 grams.

In one exemplary embodiment, the garment weight 1 has a width of approximately 1.607 inches and a length of approximately 0.625 inches. In another exemplary embodiment, the length of the garment weight 1 may be approximately 2.6 times the width of the garment weight 1. In exemplary embodiments of the garment weight 1, the ratio of the length to the width of the garment weight 1 is in the range of 2-3 to 1. In other exemplary embodiments, the garment eight 1 has a length in the range of 0.5-3.5 inches. Typically, the length of the garment weight 1 is less than 2.5 inches. These dimensions allow the garment weight 1 to be concealed by a garment while maintaining minimal visibility to the casual observer.

Figure 2:
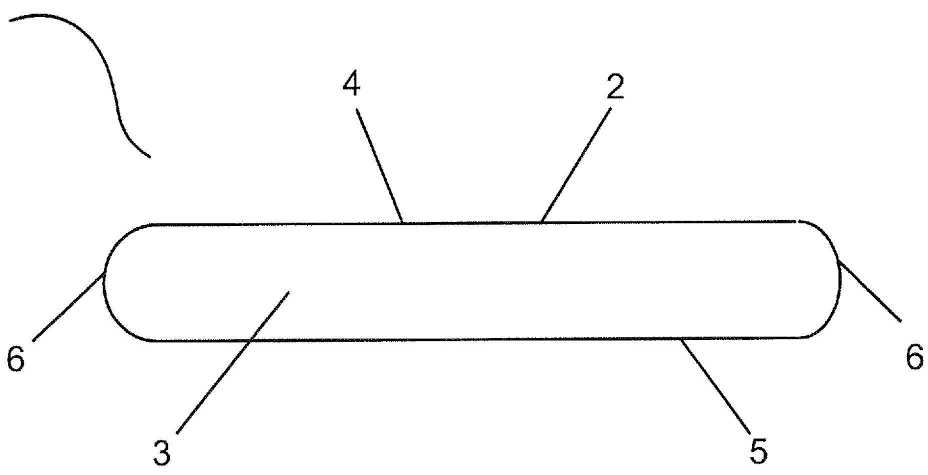
FIG. 2 shows a side view of an exemplary embodiment of the garment weight according to various embodiments described herein.

FIG. 2 shows a side view of an exemplary embodiment of the garment weight 1. An adhesive layer 2 is applied to the first surface 4 of the garment weight 1. The second surface 5 of the garment weight 1 is free of adhesive. The adhesive layer 2 may be any pressure sensitive adhesive. For example, an acrylate, including methacrylates and epoxy diacrylates, may be used to form the adhesive layer 2 of the garment weight 1. In certain embodiments, the adhesive layer 2 is strong enough to last until the user chooses to remove the garment weight 1, and weak enough to be removed from the garment without leaving residue or permanent damage.

Figure 3:
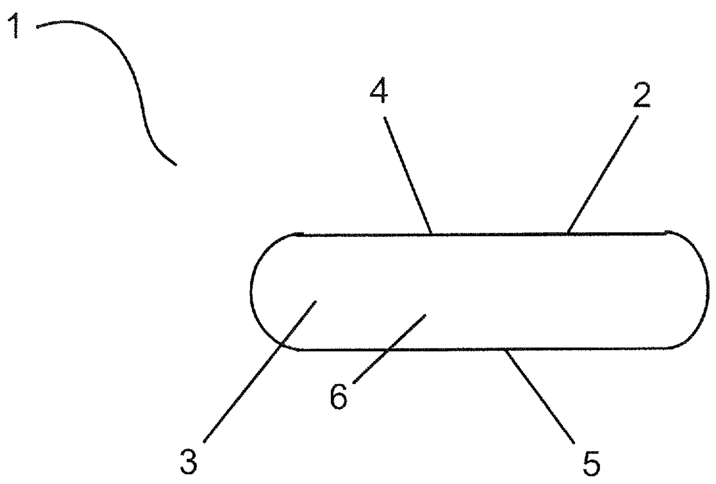
FIG. 3 shows an end view of an exemplary embodiment of the garment weight according to various embodiments described herein.

FIG. 3 shows an end view of an exemplary embodiment of the garment weight 1. The exemplary embodiment has a thickness of approximately 0.04 inches. The thickness of the garment weight 1 is typically less than 0.3 inches which allows the garment weight 1 to be concealed by a garment while maintaining minimal visibility to the casual observer and not interfering with the wearer's use of the garment. In exemplary embodiments of the garment weight 1, the thickness is in a range of 0.04 to 0.3 inches.

Figure 4:
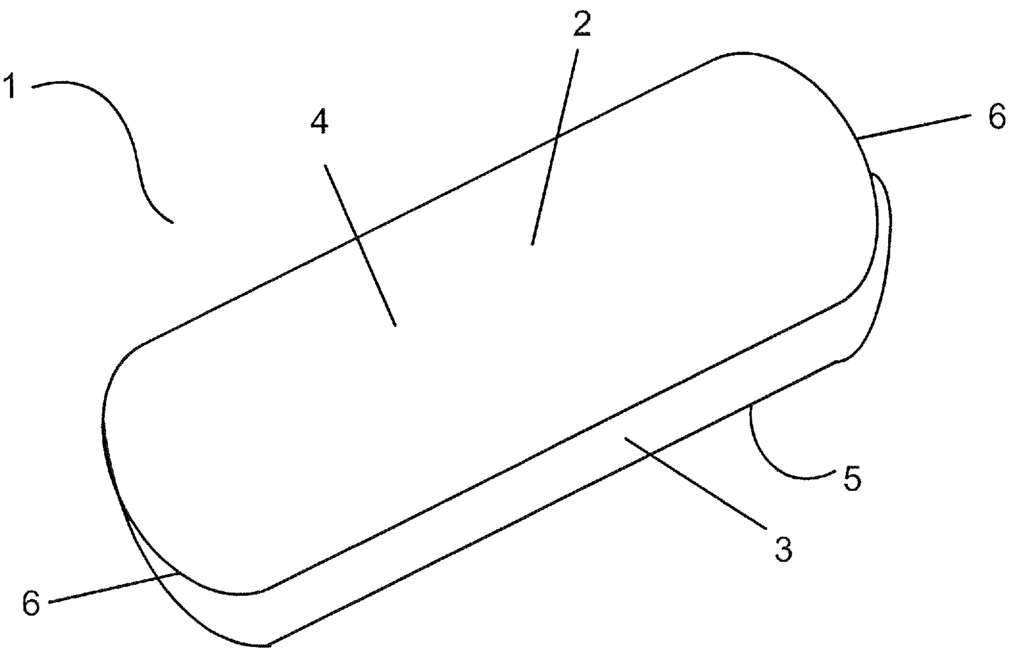
FIG. 4 shows a perspective angled view of the exemplary embodiment of the garment weight according to various embodiments described herein.

FIG. 4 shows a perspective angled view of an exemplary embodiment of the garment weight 1. The garment weight 1 can generally have a thin or low profile. This unobtrusive profile can reduce the potential for the garment weight 1 to catch or be loosened from the wearer's garment when in use. The second surface 5 may be considered a surface that opposes the garment facing surface 4 when the garment weight 1 is in use. The second surface 5 of the garment weight 1 may be flat or domed in shape. The domed or flat shape of the second surface 5 will allow the garment weight 1 to be concealed by a garment while maintaining minimal visibility to the casual observer, and will ensure optimal comfort to the wearer. As noted above, in the exemplary embodiment described, the second surface 5 of the garment weight 1 is the surface facing away from the garment when the garment weight 1 is in use, i.e., attached to a garment.

Figure 5:
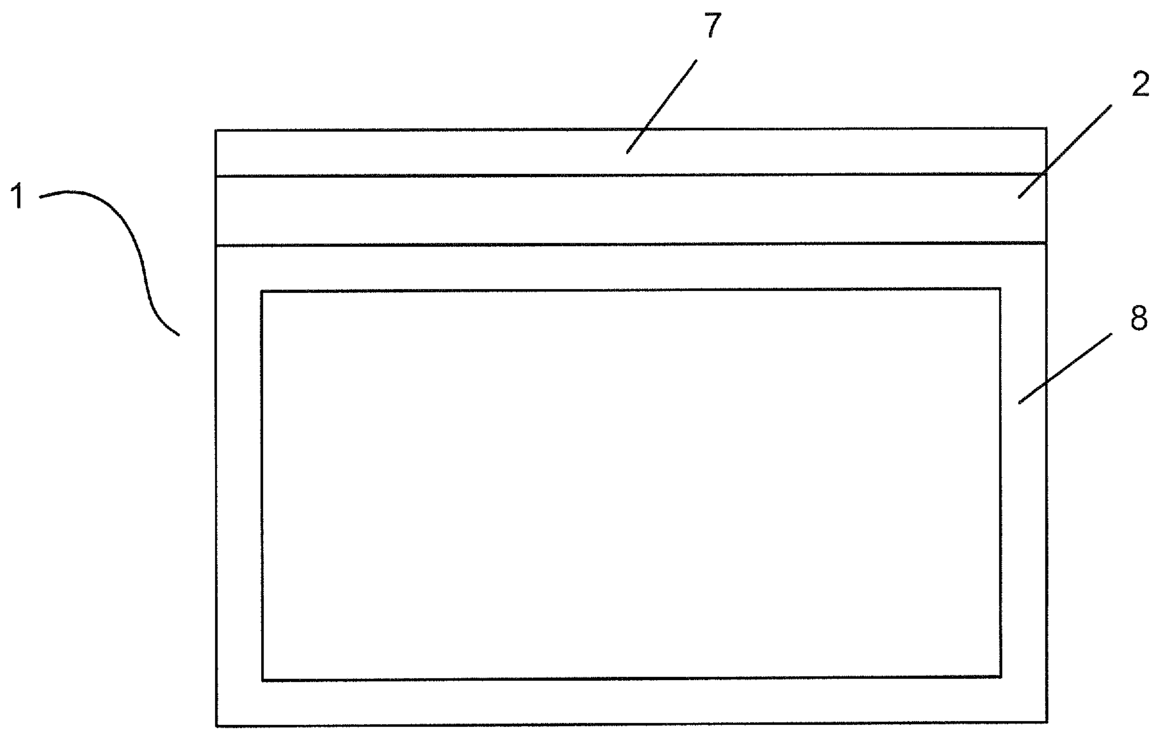
FIG. 5 shows a cross section of an exemplary embodiment of the garment weight according to various embodiments described herein.

FIG. 5 shows a cross section of an exemplary embodiment of the garment weight 1. The garment weight 1 may be sold or stored with a protective covering 7 on top of the adhesive layer 2. The protective covering 7 may prevent the adhesive layer 2 from drying out, adhering to items unintentionally, or becoming fouled with dirt or lint. The protective covering 7 may be formed from coated paper or plastic that can be removed from the garment weight 1 by peeling it away from the adhesive layer 2. The protective covering 7 may be decorative. For example, a logo or design may be printed on the side of the protective covering 7 that is not in contact with the adhesive layer 2. In certain embodiments, the protective covering 7 may be recyclable.

In certain embodiments, the garment weight 1 may be coated to reduce the risk of rust and potential discoloration of the garment due to discoloration of the metallic material, when the garment weight 1 is constructed from metallic material. The coating 8 may also improve the look and feel of the garment weight 1. The coating 8 may be a layer of paint, silicone, plastic or other material. The coating 8 may protect the fabric of the garment or the skin of the wearer from the garment weight 1. In other embodiments, the coating 8 may be decorative. For example, the coating 8 may include a brand name, a color that is aesthetically pleasing, or a color likely to blend with the garment of the wearer.

Figure 6:
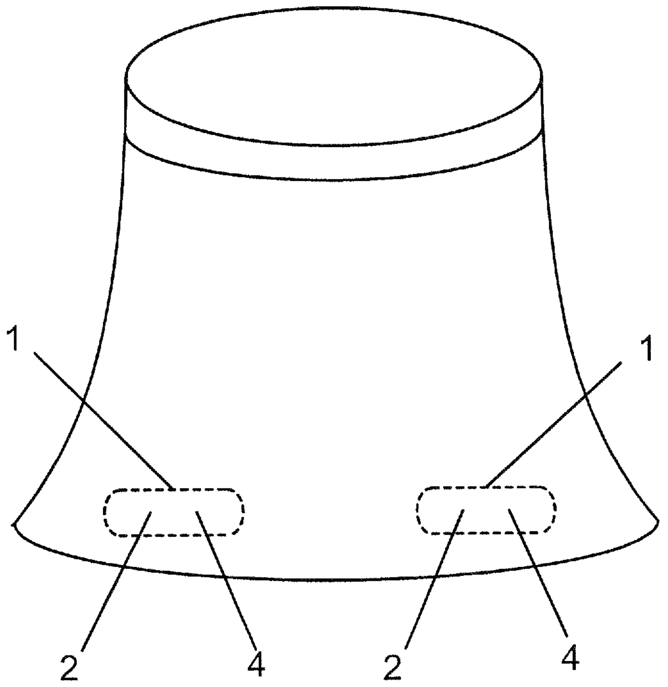
FIG. 6 shows a perspective view of a garment, specifically a skirt, having two garment weights applied horizontally to the hem thereto in accordance with one or more aspects described herein.

FIG. 6 shows the garment weight 1 applied to the hem of a garment, particularly a skirt. The garment weight 1 may be applied by removing the protective covering 7 from the adhesive layer 2 and pressing the adhesive layer 2 of the garment weight 1 against the clothing. A user can apply one or more garment weights 1 to their garment of choice prior to being exposed to wind or gusts of air. The number of garment weights 1 chosen by the wearer may depend on wind strength, desired wind protection, weight of the garment material, and/or intended use. For example, a user wearing a loose garment is recommended to wear two garment weights 1 along the interior hem of the garment and a user wearing a necktie is recommended to wear one garment weight 1 along the hem of the garment.

The garment weight 1 may be applied so that it is not apparent to observers by applying it to the inside of the garment. For example, a user can apply multiple garment weights 1 along the hem of a skirt by flipping the dress over to expose the hem and corresponding seams. The garment weights 1 may be spaced out along a hem or consolidated to a specific place on the hem. User discretion determines the ultimate number of garment weights 1 to use on a particular garment, but more garment weights 1 are recommended for windier days and lighter garments. The garment weight 1 may be applied so the longest axis runs parallel to the garment hemline, vertically from the hemline, or in any other orientation to ensure that the garment weight 1 does not disrupt the drape of the garment fabric. This will render the garment weight 1 virtually undetectable to the casual observer.

Figure 7:
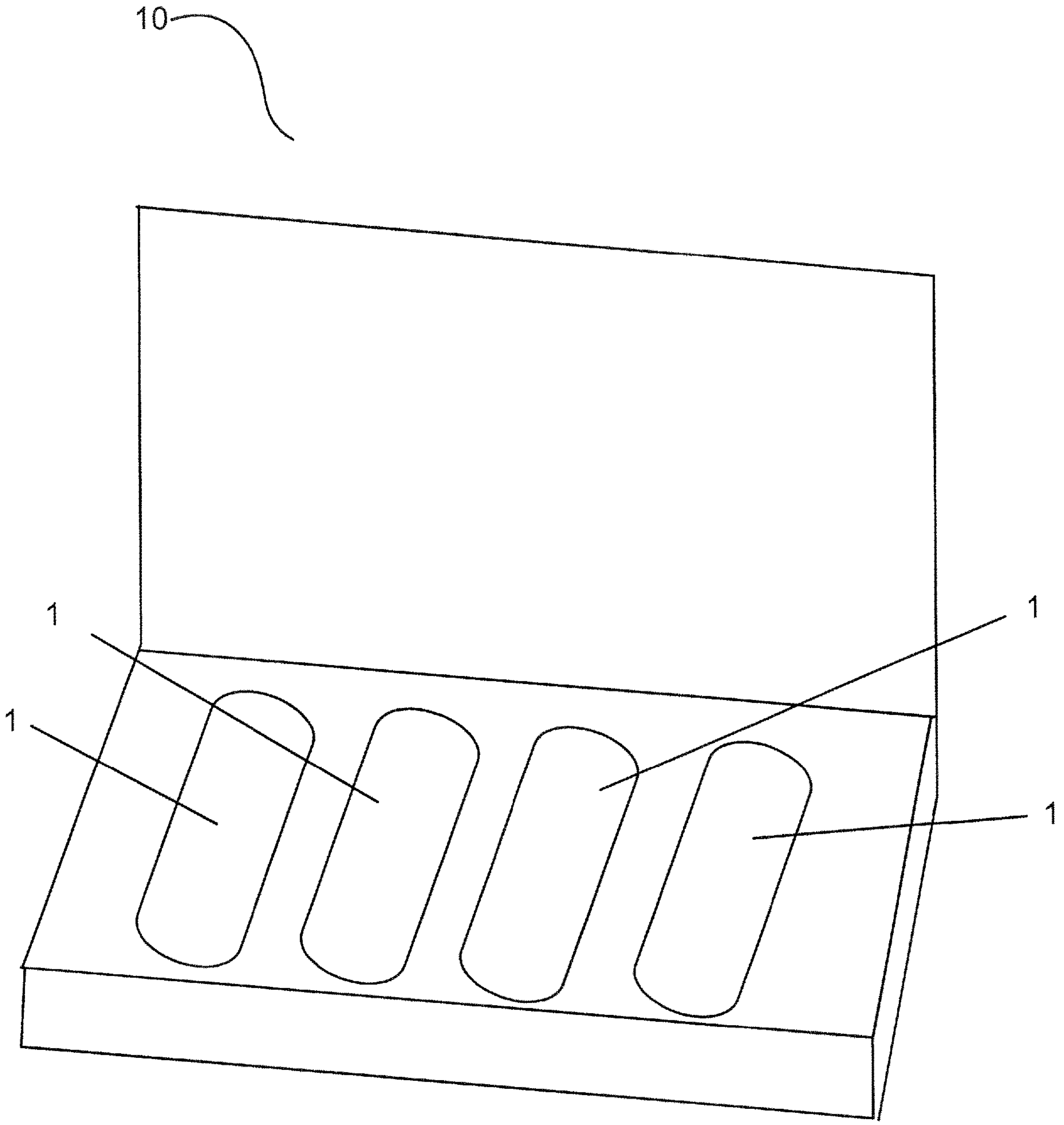
FIG. 7 shows an exemplary embodiment of a storage case that may be used in conjunction with the garment weight.

FIG. 7 shows an exemplary embodiment of a storage case 10 that may be used in conjunction with the garment weight 1. The storage case 10 may be similar in size and function to a makeup compact, e.g., approximately the size of a business card for convenient storage and have a flip open top to gain access to the garment weights 1 stored in the storage case. Thus, if the user is a woman, she may carry the storage case 10 including the garment weights 1 in her purse. In this manner, it may be that at the beginning of a day, it is not windy and the garment weights 1 are not needed. However, as the day progresses, the wind may increase and the person may decide that the garment weights 1 are needed to stop a garment (e.g., a skirt) from blowing up in the wind. Since the storage case 10 allows the person to carry the garment weights 1 at all times, the person may then apply the garment weights 1 as needed. At the end of a single use, the garment weights 1 may be removed by simply pulling them off of the garment without damage. After removing the garment weights 1 and before a next use, the garment weights 1 may be stored in the storage case 10.

Figure 8:
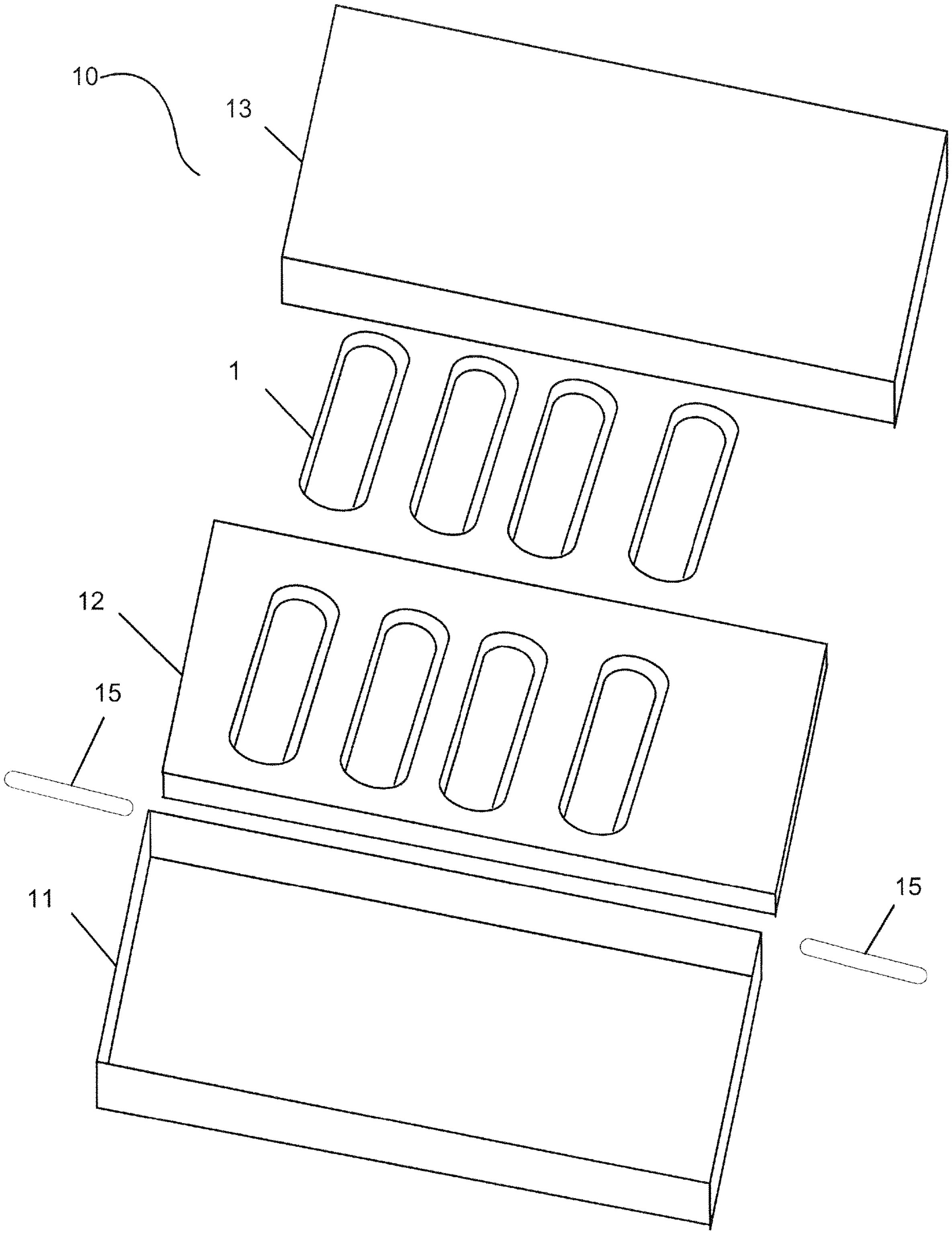
FIG. 8 shows an exploded view of the exemplary embodiment of a storage case that may be used in conjunction with the garment weight.

FIG. 8 shows an exploded view of an exemplary embodiment of the storage case 10 that may be used in conjunction with the garment weight 1. The exploded view shows that the storage case 10 comprises a bottom portion 11, a tray 12 configured to fit into the bottom portion 11, and a lid 13 that is connected to the bottom portion 11 using pins 15 that allow the lid 13 to open as shown in FIG. 7. The tray 12 includes indentations that allow the garment weights 1 to be inserted into the indentations for storage. The first surface 4 of the garment weight 1, which contains the adhesive layer 2, may be placed against or adhered to the bottom of the tray 12. As shown in FIG. 8, the bottom of the tray may have raised ridges such that the adhesive layer 2 of the garment weight 1 only touches the ridges 16 when stored in the tray 12. Thus, since only a small portion of the surface area of the adhesive layer 2 touches the tray 12, the garment weights 1 will not stick to the tray 12 and may be easily removed from the tray 12 when the user wants to use the garment weights 1. As shown in FIGS. 7 and 8, the storage case 10 may also be decorative (e.g., adorned with a logo, name, phrase, instructions, pictures, etc.) on the inside and/or outside of the lid 13. The storage case 10 may be used to easily store and organize garment weights 1 that have been previously used. The garment weight 1 may be reused until the adhesive layer 2 is no longer strong enough to adhere to a garment. The garment weight 1 may then be recycled. In another embodiment, the adhesive layer 2 may be reapplied to the garment weight 1 so it can be reused.

Figure 9:
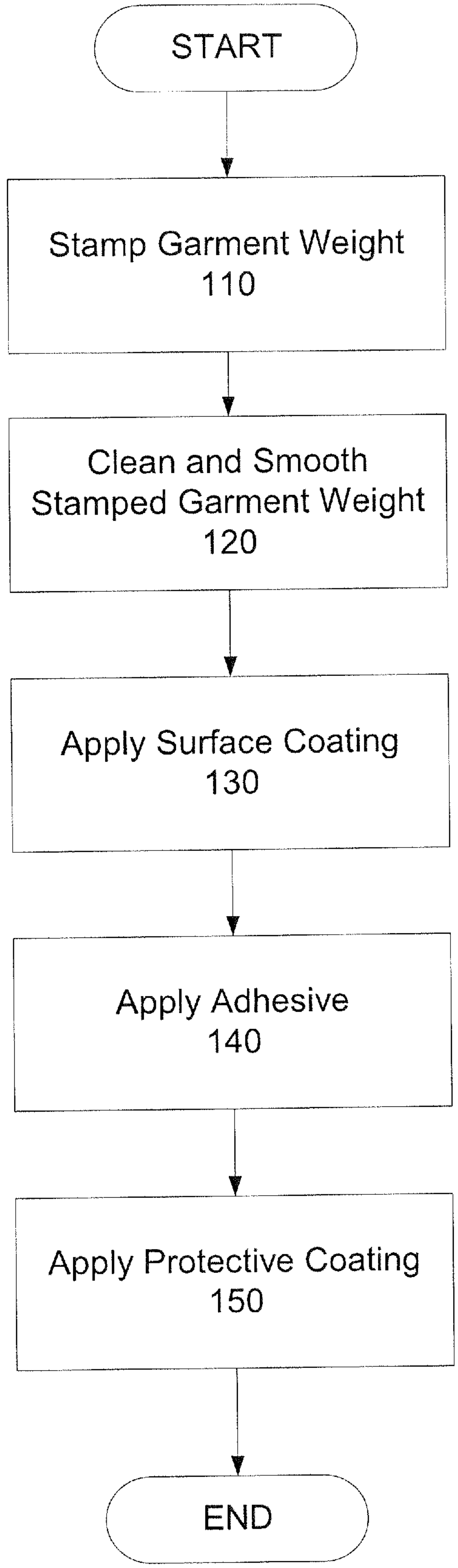
FIG. 9 shows an exemplary method for manufacturing a garment weight according to various embodiments described herein.

FIG. 9 shows an exemplary method 100 for manufacturing a garment weight 1 according to various embodiments described herein. In this example, it will be considered that the garment weight 1 is manufactured from steel and has a single layer. As described above, this is only one example and other examples may include other materials and/or multiple layers of material.

It may be considered that the manufacturing method starts with a steel plate having a desired thickness for the garment weights 1. In 110, the steel plate may undergo a stamping process that stamps out the garment weights 1 in the desired dimensions. There may be different stamps used to accommodate different dimensions. In 120, the stamped garment weights 1 may be smoothed of burs, sharp edges or other imperfections caused by the stamping process. This smoothing process may be performed using sandblasting or rolling in a barrel with an abrasive material to smooth the garment weights 1. When smooth, the garment weights 1 may be cleaned to remove the abrasive material and any oils or other particulates on the surface which could prevent the coating from adhering to the surface of the garment weight 1. It should be noted that smoothing refers to sharp edges, burrs, and the like, not that the material should be completely smooth. In fact, the surface should have some imperfections caused by the abrasive material because this may cause the coating 8 to better adhere to the surface of the garment weight 1.

In 130, the surface coating 8 may be applied to the garment weights 1 and allowed to dry. As described above, the coating 8 may be, for example, paint, silicone, plastic, etc. After the coating 8 dries, in 140, the adhesive 2 may be applied to the first surface 4. Examples of the adhesive layer 2 were provided above. In one exemplary embodiment, the first surface 4 does not receive the coating 8 so that the adhesive layer 2 is applied to the underlying steel material. In another example, the first surface 4 that is to receive the adhesive layer 2 may be coated with a different material than the other surfaces of the garment weight 1. This different material may be a material which may allow for better coverage or adhesion of the adhesive layer 2. In 150, the protective covering 1 may be applied to protect the adhesive layer 2. The garment weights 1 are then ready to be shipped and/or sold in the retail environment.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method of manufacturing a garment weight, designed to hold garments in place and prevent them from being displaced by wind gusts, comprising: stamping out the garment weight from such that the garment weight comprises a flat surface; applying a surface coating comprising silicone to the garment weight; and applying a pressure-sensitive adhesive layer to the flat surface of the garment weight where the pressure-sensitive layer comprises of an acrylate, where the acrylate comprises methacrylates or epoxy diacrylates, and further includes a protective covering, and cleaning the stamped garment weight before applying the surface coating, wherein cleaning comprises removing abrasive materials and oils; and smoothing the stamped garment weight before cleaning, wherein smoothing comprises sandblasting.

2. A method of manufacturing a garment weight comprising: stamping out a garment weight from a sheet of material, wherein the sheet comprises at least one layer and is composed of clay; smoothing the garment weight, wherein smoothing comprises sandblasting; cleaning the garment weight, wherein cleaning comprises removing abrasive materials and oils from the garment weight; applying a surface coating to the garment weight, wherein the surface coating comprises silicone;

and applying a pressure-sensitive adhesive layer composed of, methacrylates or epoxy diacrylates, the adhesive layer further comprising a protective covering.

3. The method of claim 2, wherein the garment weight is stamped out from the sheet of clay material, comprising at least one layer, and further comprising firing the garment weight after stamping out the garment weight from the sheet material.

* * * * *